United States Patent [19]

[11] 3,925,732

Tanaka et al.

[45] Dec. 9, 1975

[54] SIGNAL DETECTING DEVICE

[75] Inventors: Hideki Tanaka, Takatsuki; Mikio Watanabe, Kobe; Minoru Handa, Ikoma; Mitsuhiro Inouchi, Nishinomiya; Shigeru Yoshioka, Kobe; Kazutaka Ishida, Suita, all of Japan

[73] Assignee: Furuno Electric Company, Ltd., Japan

[22] Filed: Jan. 14, 1974

[21] Appl. No.: 432,856

[52] U.S. Cl. ................ 325/325; 325/324; 329/104; 329/106; 329/126

[51] Int. Cl.[2] ............................................ H04B 1/16

[58] Field of Search ........... 325/321, 323, 326, 473, 325/474, 475; 329/124–128, 133, 132, 104–109; 328/165–173; 343/104, 105, 109, 110, 114, 114.5

[56] References Cited

UNITED STATES PATENTS

| | | | |
|---|---|---|---|
| 2,778,933 | 1/1957 | Crist | 329/50 |
| 3,810,029 | 5/1974 | Barthelemy | 328/167 |

*Primary Examiner*—Robert L. Griffin
*Assistant Examiner*—Robert Hearn
*Attorney, Agent, or Firm*—Eugene E. Geoffrey, Jr.

[57] ABSTRACT

A signal detector for detecting weak signals in a noisy background which treats the incoming signal and samples it to produce outputs corresponding to amplitude during each sampling period. The sampled output is then accumulated for each period and an output signal of one amplitude is produced when the accumulating means is above a predetermined level and a second amplitude when the accumulating means is below said predetermined level.

5 Claims, 2 Drawing Figures

SIGNAL DETECTING DEVICE

Figure 1:
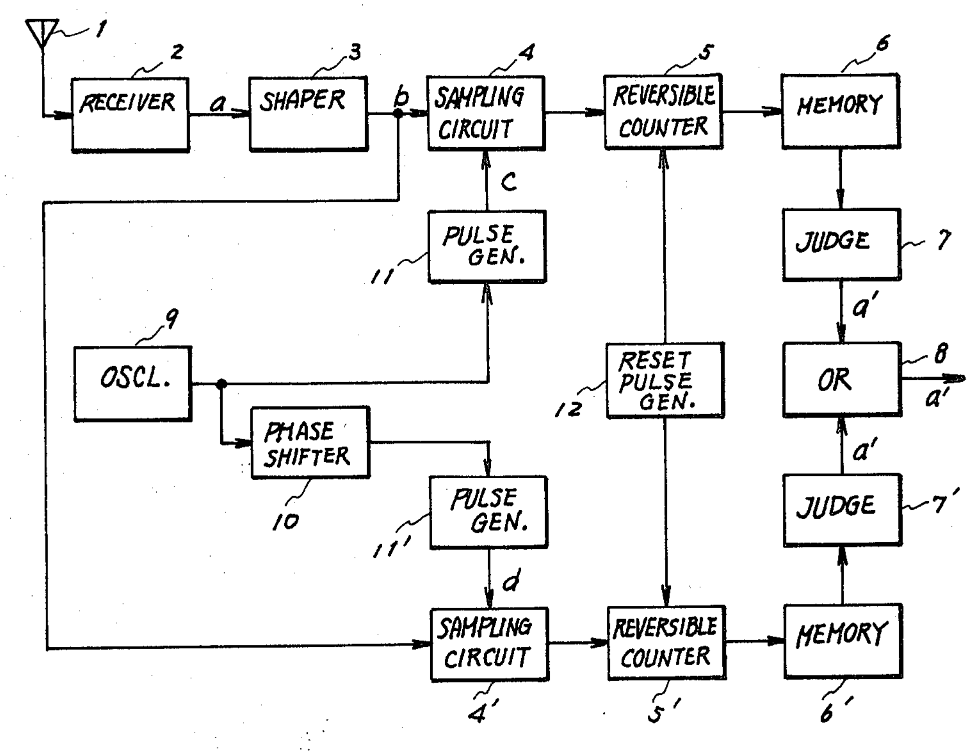

This invention relates to a signal detecting device for detecting a weak signal in a noisy background. It is preferably used for reproducing an envelope waveform of an intermittent signal transmitted at a constant frequency.

For instance, an omega signal is transmitted at a very low frequency such as 10.2 KHz and generally received at a location distant from the transmitting station. Therefore, mere half-wave rectification of the received signal as effected in a conventional AM receiver can hardly reproduce an envelope waveform corresponding to the transmitted signal.

Accordingly, an object of this invention is to provide a novel and improved device for reproducing the envelope waveform of a weak signal, which is indicative of the transmission period or interval of the signal.

The device according to this invention comprises a receiver for receiving an incoming signal, means for sampling said incoming signal at a frequency equal to the frequency of said incoming signal and producing an output indicative of the wave height of said incoming signal at each sampling position, means for accumulating reversely the output of said sampling means, means for resetting sad accumulating means at predetermined times related to the sampling periods and means for generating a signal having a first level when the output of said accumulating means is above a predetermined level and a second level when it is below said predetermined level.

Other features and operation of this invention will be described in detail hereinunder with reference to the accompanying drawings.

Figure 2:
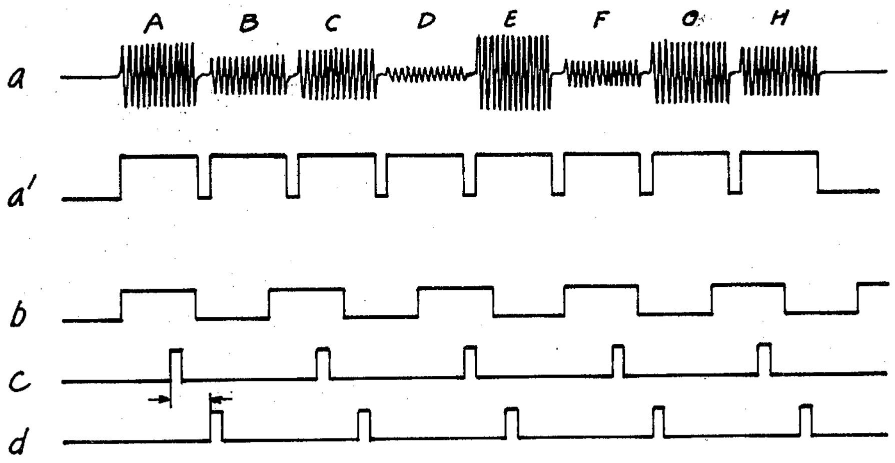

In the drawings:

FIG. 1 is a block diagram representing a circuit configuration of an embodiment of the device of this invention; and FIG. 2 is a diagram representing waveforms appearing at various points of the circuit of FIG. 1.

Referring to FIG. 1, a receiver 2 having an antenna 1 is coupled to a waveform shaper circuit 3 and the output of the shaper 3 is coupled to a pair of sampling circuits 4 and 4'. The sampling circuit 4 is coupled through a reversible counter 5, a memory circuit 6 and a judging circuit 7 to one input of an OR circuit 8. The sampling circuit 4' is also coupled through a reversible counter 5', a memory circuit 6' and a judging circuit 7' to another input of the OR circuit 8. The device also includes an oscillator 9 having an output applied through a sampling pulse generator 11 to the sampling circuit 4 and also through a phase shifter 10 and a sampling pulse generator 11' to the sampling circuit 4'. The reset pulse generator 12 has outputs applied to the reversible counters 5 and 5' respectively.

The operation of the device of FIG. 1 will be described in conjunction with the waveforms of FIG. 2. In an omega system, the signal received by the antenna 1 and the output from the receiver 2 exhibits a waveform as shown at a in FIG. 2 for example. The signal consists of eight segments A, B, C, . . . H which have a common fixed frequency such as 10.2 KHz but have been transmitted from separate transmitting stations located at various distances.

The signal a is shaped by the shaper circuit 3 into a square waveform as shown at b in FIG. 2. It should be noted that the time axis of the waveform b of FIG. 2 is extremely expanded with respect to the time axis of the waveform a and only corresponds to a part of one segment, for example A, of the waveform *a*. The waveform *b* is applied to the sampling circuits 4 and 4', respectively.

The oscillator 9 generates a continuous oscillating output having the same frequency as the signal a and the sampling pulse generators 11 and 11' produce similar sampling pulses c and d based upon the output of the oscillator 9. As shown in FIG. 2, the sampling pulses c and d have the same frequency as the waveform *a*, and consequently, the waveform *b* but have a pulse width or pulse duration which is sufficiently less than the half wave-length of the waveform *b*. Moreover, the sampling pulse *d* is delayed in phase by the phase shifter 10 with respect to the sampling pulse *c* by a predetermined value $\phi$. The pulses *c* and *d* are applied to the sampling circuits 4 and 4', respectively, as gate control pulses.

In the sampling circuits 4 and 4', the signal *b* is sampled under control of the sampling pulses *c* and *d*. The output level of each sampling circuit is one of two levels and is limited to either of the two levels because it is indicative of the wave-height of the waveform *b*. The sampling pulses have the same frequency as the signal *b*. When the reference level is selected at the mean of both levels, the outputs of the sampling circuits 4 and 4' are accumulatively added or subtracted in the reversible counters 5 and 5' respectively in accordance with their polarities and increase successively the absolute values of the corresponding outputs of the counters. However, noise signals included in the signal *b* are generally not synchronous with the sampling pulses *c* and *d* and the sampled noises included in the sampling circuits 4 and 4' have high and low levels at random. Therefore, the noise components are mutually canceled during the accumulation in the reversible counters 5 and 5' and the count outputs of the counters do not contain a noise component. The reset pulse generator 12 generates a reset pulse which resets the reversible counters 5 and 5' at a predetermined time interval. This time interval may be selected so that even the minimum level of the incoming signal becomes sufficiently distinguishable after the accumulation in the reversible counters.

The outputs of the counters 5 and 5' just before the resetting operation are stored in the memory circuits 6 and 6' until the next resetting operation and continuously supplied to the judging circuits 7 and 7', respectively. The judging circuits 7 and 7' serve the function of producing an output of two levels, one level being produced when the input level is above a predetermined level and the other level when it is below the predetermined level. If the predetermined level is selected suitably at a minute value, the high level outputs of the judging circuits 7 and 7' tend to correspond to the interval in the waveform a in which the signal exists and the low level outputs tend to correspond to the interval in which no signal exists. Thus, the outputs of the judging circuits 7 and 7' tend to have a waveform as shown at a' in FIG. 2 which clearly indicates the signal interval of the incoming signal *a*.

Even if the circuits 10, 4', 5', 6', 7' and 11' are omitted from the device of FIG. 1, the waveform *a'* can be obtained from the judging circuit 7 and the object of this invention can be attained if the sampling pulse *c* appears at a time point sufficiently remote from the leading and trailing edges of the waveform *b*. In case that the sampling pulse appears accidentally in the vicinity of one of these edges, there is some probability of superposition of the sampling pulse with said edge of the waveform *b* due to accidental phase variation. When the sampling pulse overlaps with the leading or trailing edge of the waveform *b*, the output level of the sampling circuit becomes uncertain and the output level of the judging circuit becomes also uncertain. In order to avoid such a difficulty, another waveform *a'* is produced by the judging circuit 7' based upon the sampling pulse *d* which is delayed in phase by $\phi$ with respect to the sampling pulse c. Due to this delay, one of the sampling pulses *c* and *d* never overlaps with the leading or trailing edge of the waveform *b* even if the other overlaps with it, and one of the outputs of the judging circuits 7 and 7' is always certain even if the other is uncertain. Therefore, the output of the OR circuit 8 can always produce the waveform *a'* with certainty. Accordingly, it is possible to omit the above additional circuits by providing suitable means for controlling the phase of the sampling pulse *c* with respect to the waveform *b* to remove the abovementioned overlap condition.

The phase difference $\phi$ between the sampling pulses *c* and *d* may be selected as desired provided that it is somewhat greater than the duration of the sampling pulses, if the leading and trailing edges of the waveform *b* are always clear and definite. However, both edges are generally rendered indefinite by noise and incidental phase variation. In order to obtain the best result in such a general condition, it is recommended that the phase difference be selected as 90°, because, in this phase condition, the most desirable sampling can be effected by one of the sampling pulses *c* and *d* when the other sampling pulse is in the worst condition, that is, it overlaps with the leading or trailing edge of the waveform *b*. Thus, the phase difference $\phi$ is preferably set at 90° in the phase shifter 10.

Although this invention is described above in conjunction with the embodiment of FIG. 1, it should be understood that various modifications and changes can be made without departing from the spirit and scope of the invention as claimed in the appended claims. For example, though the incoming signal a is shaped into a square waveform *b* by the shaper circuit 3 and the outputs of the sampling circuits 4 and 4' are processed in digital fashion in the embodiment of FIG. 1, this invention is also applicable to a device in which the incoming signal a is directly applied to the sampling circuits 4 and 4' and the outputs thereof are accumulated and stored in analog fashion.

As described in the above, according to the device of this invention, even a weak incoming signal can be transformed into a definite envelope waveform regardless of a noisy background and the resultant waveform can be used for measuring the signal interval at high accuracy. Accordingly, a great advantage can be expected especially when the device of this invention is used in the station selecting or discriminating system of an omega system.

We claim:

1. A signal detecting device, comprising a receiver for receiving an incoming signal, means for sampling said incoming signal at a frequency synchronized with the frequency of said incoming signal and producing an output indicative of the amplitude of said incoming signal at each sampling position, means for algebraically accumulating the output of said sampling means, means for resetting said accumulating means at predetermined intervals during sampling, means for storing said accumulated output just prior to resetting said accumulating means, and means for generating a signal having a first level when the output level of said means for storing said accumulated output is above a predetermined level and a second level when it is below said predetermined level.

2. A signal detecting device, according to claim 1, wherein said sampling means comprises a sampling pulse generator for generating a sampling pulse train at a frequency equal to the frequency of said incoming signal and a sampling circuit for sampling said incoming signal under control of said sampling pulse train and producing an output signal having two levels indicative of the amplitude of said incoming signal at each sampling position, and said accumulating means comprises a reversible counter.

3. A signal detecting device, according to claim 1, wherein said signal generating means comprises a memory circuit for storing the output of said accumulating means just before the resetting operation of said accumulating means until the next resetting operation, and a judging circuit for producing an output signal having said first level when the output level of said memory circuit is above a predetermined level and said second level when it is below said predetermined level.

4. A signal detecting device, comprising a receiver for receiving an incoming signal, means for sampling said incoming signal at a frequency equal to the frequency of said incoming signal and producing an output indicative of the amplitude of said incoming signal at each sampling position, means for accumulating the output of said sampling means, means for resetting said accumulating means at predetermined intervals during sampling, and means for generating a signal having a first level when the output level of said accumulating means is above a predetermined level and a second level when it is below said predetermined level, said sampling means comprising a pair of sampling pulse generators for generating a pair of sampling pulse trains having a frequency equal to the frequency of said incoming signal and a mutual phase difference and a pair of sampling circuits for sampling said incoming signal under control of said pair of sampling pulse trains respectively and producing a pair of output signals having two levels indicative of the amplitude of said incoming signal at each sampling position, said accumulating means comprising a pair of reversible counters for counting said pair of outputs of said sampling means respectively, said signal generating means comprising a pair of signal producing circuits for producing a pair of signals having said first level when the output level of the corresponding reversible counter is above a predetermined level and said second level when it is below said predetermined level, and said device further comprises an QR circuit for producing a logic sum of the outputs of said pair of signal producing circuits.

5. A signal detecting device, according to claim 4, wherein said phase difference between said pair of sampling pulse trains is 90°.

* * * * *